(12) United States Patent
James et al.

(10) Patent No.: US 8,839,866 B2
(45) Date of Patent: Sep. 23, 2014

(54) SOLIDS FREE SEALING FLUID

(75) Inventors: Simon James, Le Plessis-Robinson (FR); Michel Michaux, Varrières-le-Buisson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 358 days.

(21) Appl. No.: 12/993,335

(22) PCT Filed: May 25, 2009

(86) PCT No.: PCT/EP2009/003683
§ 371 (c)(1),
(2), (4) Date: Feb. 4, 2011

(87) PCT Pub. No.: WO2009/152923
PCT Pub. Date: Dec. 23, 2009

(65) Prior Publication Data
US 2011/0114315 A1    May 19, 2011

(30) Foreign Application Priority Data

May 28, 2008 (EP) .................................... 08157067

(51) Int. Cl.
*E21B 43/22* (2006.01)
*E21B 33/13* (2006.01)
*C09K 8/42* (2006.01)
*C04B 22/16* (2006.01)
*C04B 22/12* (2006.01)

(52) U.S. Cl.
CPC ................. *C04B 22/12* (2013.01); *C09K 8/428* (2013.01); *C04B 22/16* (2013.01)
USPC ........................................ 166/300; 166/293

(58) Field of Classification Search
None
See application file for complete search history.

(56) References Cited

U.S. PATENT DOCUMENTS

| 4,662,448 | A |   | 5/1987  | Ashford et al. |            |
|-----------|---|---|---------|----------------|------------|
| 5,088,555 | A | * | 2/1992  | Shu            | 166/292    |
| 5,377,757 | A | * | 1/1995  | Ng             | 166/277    |
| 6,105,673 | A |   | 8/2000  | Harris et al.  |            |
| 6,569,235 | B2|   | 5/2003  | Carter, Jr.    |            |
| 6,860,936 | B2|   | 3/2005  | Carter, Jr.    |            |
| 2004/0159431 | A1 | * | 8/2004 | Eoff et al.   | 166/293    |
| 2006/0086501 | A1 |   | 4/2006 | Creel et al.  |            |
| 2007/0261854 | A1 | * | 11/2007 | Nguyen et al. | 166/308.2 |

FOREIGN PATENT DOCUMENTS

| EP | 2055683   |    | 5/2009  |
|----|-----------|----|---------|
| RU | 2166613 C2| *  | 5/2001  |
| WO | 00/66878  |    | 11/2000 |

* cited by examiner

*Primary Examiner* — Zakiya W Bates
(74) *Attorney, Agent, or Firm* — Michael Dae

(57) ABSTRACT

Providing a solution of at least one salt capable of reacting with a set cement to form a solid phase comprising a precipitate or an expanded phase of the cement; contacting a region of the set cement to be repaired with the solution so as to form the solid phase in voids in the region of the set cement to be repaired.

16 Claims, 6 Drawing Sheets

SOLIDS FREE SEALING FLUID

TECHNICAL FIELD

This invention relates to the repair of cracks, micro-annuli and other voids in cement sheaths. In particular the invention relates to the injection of solids-free salt solutions into an area with damaged cement.

BACKGROUND ART

Cement structures in wellbores such as cement sheaths and cement plugs, can be damaged resulting in failures i.e. micro-annuli, cracks, and other voids, in the cement.

A number of ways are currently used to repair these failures. Micro-cement systems such as SqueezeCRETET™ (Schlumberger) are used to repair cracks and other voids in cement sheaths. These formulations are able to penetrate cracks with widths down to about 120 microns. However the size and concentration of the micro-cement particles do not allow penetration into cracks of smaller size. Nano-sized based sealants have improved penetration (EP application no. 07119640.6) compared with micro-cement based sealing technologies but it is difficult to retard the setting reaction. Alkali swellable latex (ASL) solutions also have better penetration than micro-cement systems and will set only in contact with the cement (or other high pH source). However the long term durability of the ASL solutions have not been established.

WO 00/66878 discloses a sealing material made by combining an oxide or hydroxide and a phosphate with water to form a slurry which cures to form a high strength, minimally porous material which binds to underground formations, steel and ceramics. However, this material contains solids such as fly ash or insolubles oxide which reduce the injectivity; moreover the material sets on his own which requires more engineering work in order to make sure that the sealing material is liquid during a long enough period of time to be pumped but then should set in a reduced period of time for being industrially interesting.

US 2006/086501 describes a sealant composition comprising a swelling agent to maintain isolation of the formation, or reduce fluid loss in a well bore. In this patent application the swelling agent is a swelling polymer that swells when in contact with water.

The current invention aims to avoid the disadvantages of previous solutions by providing a solids-free repair fluid that can penetrate small gaps in cement structures of wellbores and for which the resultant solid formed are known to have long term durability.

DISCLOSURE OF THE INVENTION

Accordingly a first aspect of the invention comprises a method of repairing a set cement in a wellbore comprising: providing a solution of at least one salt capable of reacting with a set cement to form a solid phase comprising a precipitate or expanded phase of the cement;
contacting a region of the set cement to be repaired with the solution so as to form the solid phase in voids in the region of the set cement to be repaired. By "forming the solid phase", it has to be understood in the context of the present invention that the solution, which preferably does not have cementitious properties in and of itself, expands when in contact with set cement and this preferably occurs in voids in the region of the set cement to be repaired.

Preferably the method comprises providing the solution in substantially solids-free form. By solids-free it has to be understood, in the context of the invention, a solution substantially free of solids meaning a solution containing salt(s) at a concentration below the solubility limit of said salt(s) under given conditions. It will be apparent to the person skilled in the art that optionally some colloidal particles and/or lattices might be added to the solution although not critical.

Preferably the method comprises providing a solution which reacts with calcium, hydroxide and or sulphate ions in the interstitial water of the set cement.

The solution preferably comprises one or more of alkali metal silicates, magnesium chloride, iron chlorides or other iron salts, aluminium chloride, alkali metal aluminates, magnesium phosphate, potassium phosphate, sodium fluoride and/or sodium phosphate solutions.

The solution may be an iron (III) chloride solution.

To modify the properties of the solution the solution may further comprise water soluble polymers.

Preferably the method comprises injecting a spacer fluid into the well before contacting the cement with the salt solution.

A squeeze cementing operation can be performed after injecting the salt solution into the well and allowing the solution to contact the set cement.

The method may be performed in a high temperature environment. For example in temperatures up to at least 350° C.

A second aspect of the invention comprises a composition for repairing a set cement structure in a well as described above comprising a solution of at least one salt capable of reacting with a set cement to form a solid phase comprising a precipitate or an expanded phase of the cement.

MODE(S) FOR CARRYING OUT THE INVENTION

Figure 1:
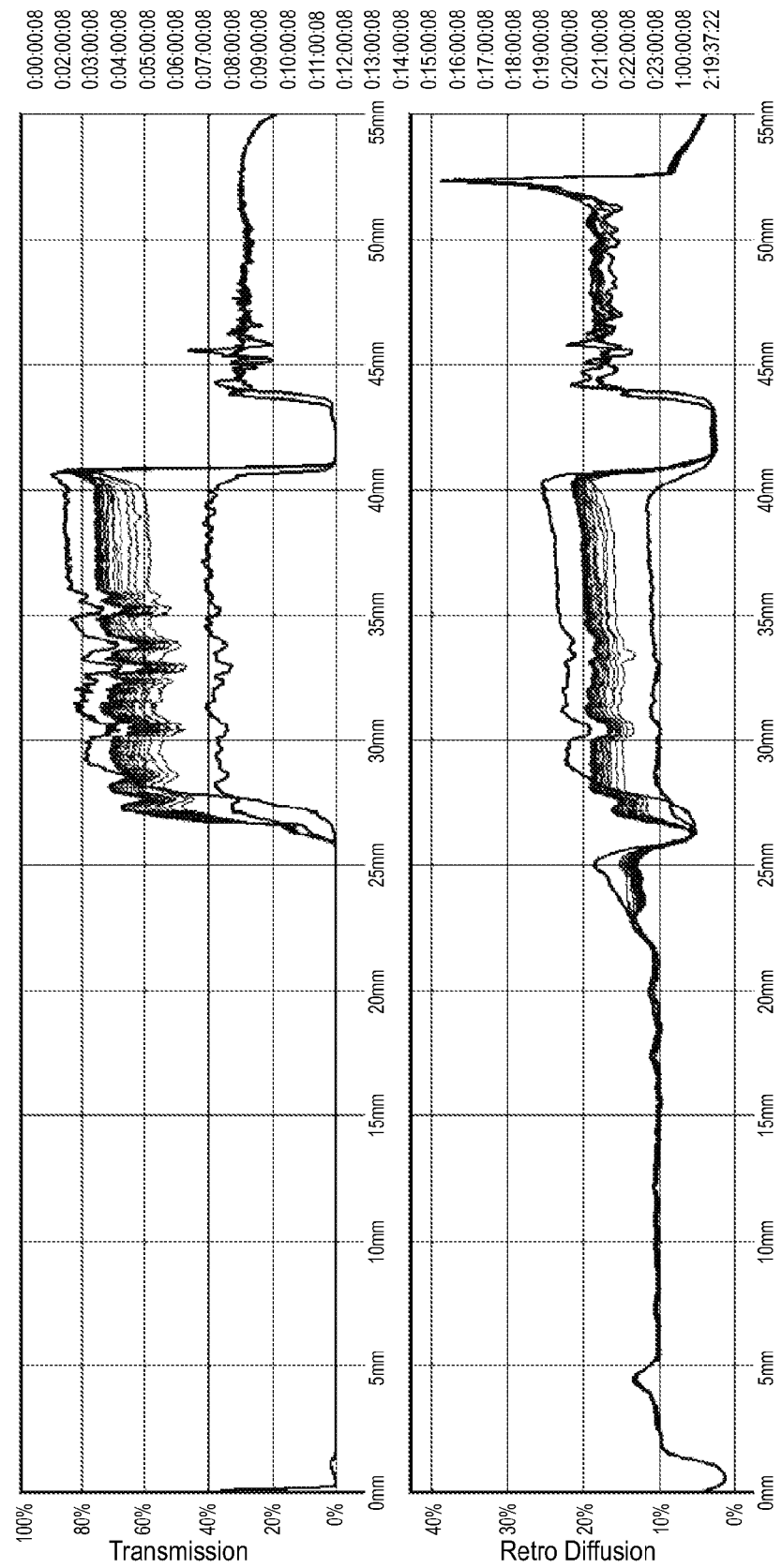
FIG. 1 shows the optical transmission (top) and back scattering (bottom) results for cement treated with a sodium metasilicate solution.

The solids free metal solution, such as an iron III chloride solution is pumped down into a wellbore and through one or more holes in a casing or tubing to contact a damaged cement sheath. The low viscosity, solids free solution can penetrate easily into small gaps in the cement sheath. When the solution is in contact with the cement the solution will react with hydroxide ions of the set cement to precipitate iron (III) hydroxide, which has a very low solubility. The set cement comprises a set cement matrix with small pores distributed throughout the set cement and the calcium and hydroxide ions are present in the interstitial water of the set cement. The iron (III) hydroxide formed will block the voids in the cement and prevent unwanted fluid flow through the cement sheath. To ensure the solution does not react with other sources of anions and cations a spacer fluid can be used to separate the salt solution from other sources. The spacer fluid may be fresh water or any other low viscosity solids free solutions, provided the solution does not precipitate with the salt solution or with the cement.

Other solid free salt solutions are also applicable for repairing cement e.g. sodium silicate, iron (II) chloride, iron (III) sulphate, iron (II) sulphate, sodium aluminate, magnesium chloride, sodium phosphate. The salt solution used should react with the hydroxide ions or calcium ions or sulphate ions present in the set cement to form a precipitate. It is preferred that salt solutions are solids-free i.e. contain no appreciable content of suspended solids, and thus contain essentially only dissolved substances. This allows the solution to penetrate into small gaps of the cement. Other solutions that may be used to repair gaps by forming a precipitate with the hydroxide, calcium and/or sulphate ions of the interstitial water of the cement include:

Sodium silicate—The calcium ions of the set cement will react with the sodium silicate solution to precipitate calcium silicate hydrate the calcium silicate hydrate will block the voids in the cement and prevent fluid flow through the cement sheath.

Magnesium chloride—When set cement is placed in contact with a magnesium chloride solution the magnesium ions will react with the calcium hydroxide present to form magnesium hydroxide. In uncontrolled situations contact of magnesium containing solutions with set cement may lead to degradation of the cement. However, in the present invention the brine is deliberately injected in a controlled way to form a seal. The magnesium hydroxide may exist in two forms. If the magnesium replaces the calcium within the cement the magnesium hydroxide will have a larger volume than the calcium hydroxide and the ion exchange will thus cause the cement to expand to close the crack or micro-annulus. If the magnesium hydroxide precipitates directly in the crack then this will form a seal.

Magnesium sulphate—The magnesium ions will potentially form seals as described above. However when magnesium sulphate is used the presence of sulphate ions will also precipitate in the presence of calcium to form calcium sulphate. Thus the fissures or micro-annuli may be plugged by a combination of cement expansion and the precipitation of both calcium sulphate and magnesium hydroxide. Sulphate ions may also react with calcium aluminate hydrates to form secondary ettringite (a calcium sulphoaluminate hydrate) that may cause the cement matrix to swell.

Nickel chloride—When nickel chloride is used the presence of hydroxide ions from the set cement will result in a gel of nickel hydroxide forming. The volume of gel formed for a given concentration of ions can be increased significantly by the incorporation of polynaphthalene sulphonate (PNS)—it has been shown that 1 g of nickel hydroxide can absorb about 2 g of PNS (M. Michaux unpublished work). The concept of using PNS to increase the volume of precipitated gel may also be applicable to other salt solutions, i.e. in the precipitation of $Mg(OH)_2$.

Sodium or potassium carbonate—These salts can cause precipitation of calcium carbonate when in contact with calcium ions from the cement.

Sodium or potassium aluminate—Contact of sodium (or potassium) aluminate with set cement may lead to the precipitation of calcium aluminate hydrate or calcium sulphoaluminate hydrate. The precipitation of the salts would lead to blockage of the micro-annuli or cracks. In the case of calcium aluminate hydrate precipitation the reaction may be increased by incorporating a lithium salt into the sodium aluminate solution, as lithium salts are known to be accelerators of calcium aluminate cements.

Iron (III) sulphate—This salt can cause precipitation of iron (III) hydroxide when in contact with the hydroxide ions of the cement.

Aluminium chloride—Aluminium chloride will also precipitate in the presence of hydroxides. However, the use of these salts may lead to corrosion problems.

Sodium fluoride—Sodium fluoride will precipitate calcium fluoride when in contact with cement.

Advantages of the inventions are that as the solution used is free from solids it is able to penetrate into very small gaps from where it may react with cement. The system will only set up when the solution is in contact with the cement that needs to be repaired, a spacer may be used to separate the solution from other cation and anion sources. The minerals formed from the reaction with the cement are known to have long term durability.

The invention is now described by way of example:

Example 1

A cement system is formulated at a density of 1890 kgm$^{-3}$ with class G well cement. The system contains 2.7 L/tonne silicone antifoam agent, 6.7 L/tonne polynaphthalene sulphonate dispersant and 0.03% bwoc (by weight of cement) biopolymer anti-settling agent. The slurry is cured in small plastic pots in a water bath for 3 days at 60° C. The pots are removed from the water bath and kept at ambient temperature for 4 days. A layer of water is kept on top of the cement at all times to prevent drying. Water is poured off the cement surface and the surface is scratched with a spatula to remove the debris and carbonation products. 10 ml of different solutions are then poured onto the surface of the cement samples and the bottles resealed and allowed to stand at ambient conditions. Visual observation of the samples is made periodically.

The solutions prepared are shown below in Table 1.

TABLE 1

| Solution | Sodium metasilicate | Distilled Water | |
|---|---|---|---|
| 1 | 30 g | 70 g | |
| 2 | 20 g | 80 g | |
| 3 | 15 g | 85 g | |
| 4 | 10 g | 90 g | |
| | Sodium Polysilicate | Distilled water | Equivalent solid:water mass ratio |
| 6 | 40 g | 10.7 g | 30:70 |
| 7 | 25 g | 23 g | 20:80 |
| 8 | 20 g | 30.6 g | 15:85 |
| 9 | 12.5 g | 35 g | 10:90 |
| A | $NaH_2PO_4 \cdot 2H_2O$ 19.5 g | 30.5 g | 30:70 |
| B | $Na_3PO_4$ 8 | 92 | 8:92 |

The sodium metasilicate, $Na_2SiO_3$ (anhydrous salt), was prepared as various solutions to cover a range of concentrations (solutions 1-4).

The sodium polysilicate solution has a $SiO_2$ to $Na_2O$ weight ratio of 3.3. This is a solution of 38 g sodium silicate in 62 g water. Solutions 6-9 were formulated to give the same sodium silicate concentration as for the sodium metasilicate solutions.

The sodium dihydrogen phosphate ($NaH_2PO_4.2H_2O$) solution was formulated to give the same mass concentration as the highest sodium silicate concentration.

The trisodium phosphate ($Na_3PO_4$) solution was formulated just below saturation (solubility in water is 10.8 mass % at 20° C.).

Small plastic bottles of the solutions were kept next to the cement samples to allow difference between the solutions on the cement and the pure solutions to be observed.

Results after 2 days

Solution 1—The most precipitate was present but the control bottle also had some precipitation (the control solution was probably slightly over saturated).

Solution 2 and 3—More precipitation than in the control bottles indicating reaction with the cement.

Solution 4—A very thin layers of precipitation: much less than solutions 2 and 3 but more than in the control solution.

There was no precipitation in solutions 6-9 or in solutions A and B.

Results after 7 days

Solution 6—no precipitation observed.

Solutions 7 to 9—some precipitation observed. There appears to be more precipitation with decreasing silicate concentration.

There was no visible precipitation in solutions A and B after 3 months exposure to the cement. Solution 6 showed precipitation after 3 months in contact with cement.

The control bottles did not show any precipitation after 3 months except for solution 1 where some precipitation (as the solution was close to saturation) was observed.

When monosilicate anions are present there is precipitation of calcium silicate hydrate. In general the higher the concentration of monosilicate ions the more precipitation occurs.

When polysilicate anions are present a calcium polysilicate gel is formed (polysilicate species bridged by calcium ions). The degree of polymerisation depends on the $SiO_2$ to $Na_2O$ ratio and the silicate concentration. At the more dilute concentrations the polysilicate anions depolymerise quickly and calcium silicate hydrates are precipitated. At the higher concentration it takes significant time to depolymerise the polysilicates (there is no depolymerisation if the solution is not diluted), and therefore to precipitate calcium silicate hydrate.

Surprisingly even though calcium phosphate is highly insoluble (solubility constant=$2 \times 10^{-33}$) there is insufficient reaction with the cement. It is possible that a very fine layer of precipitate is formed that then prevents further reaction between the cement and the phosphate solution.

Example 2

Brine precipitation Tests—Visual

Similar tests to that presented above in Example 1 were performed with further salt solutions placed on the surface of the set cement. The solutions used and the results obtained are shown in the table 2 below with the amount of precipitate indicated (none<trace<little<some).

TABLE 2

| | | Precipitate - Visual | | |
|---|---|---|---|---|
| Salt | Salt g/50 g solution* | After 6 hours | After 24 hours | After 72 hours |
| $FeSO_4$ | 7.5 | Some | Some | Some |
| $Fe_2(SO_4)_3$ | 15 | Little† | Little† | Little† |
| $FeCl_3$ | 7.5 | Some | Some | Some |
| $MgCl_2 \cdot 6H_2O$ | 16 | None | None | trace |
| $Na_2CO_3$ | 7.5 | None | None | trace |
| $Na_2SO_4$ | 7.5 | None | None | trace |
| NaF | 1.5 | None | Little | Some |

*The salt is diluted with distilled water to make 50 g of solution.
†Due to the colour of the concentrated brine it was difficult to determine the amount of precipitation.

The $FeCl_3$ solution was obtained by diluting a concentrated solution of $FeCl_3$. The equivalent quantity of anhydrous $FeCl_3$ in 50 g of the final solution was 7.5 g.

All solutions show some precipitate but the iron salts appeared to be the most effective.

Example 3

Brine Precipitation Tests—Turbiscan

A similar procedure to that in Example 2 was performed except that the samples were prepared for analysis in a Turbiscan device (http://www.turbiscan.com/home/lab_present1.htm). Cement was cured in the Turbiscan sample jars and then brine was placed on top of the cement and the sample jar placed in the Turbiscan device. The Turbiscan measures the optical transmission and back scattering from the samples every 40 microns from top to bottom. The device repeats the measurements at pre-defined intervals to allow a time lapse image of changes in the fluid to be seen. The results are shown in FIGS. 1 to 4. All tests were run at 27° C. The top graph is transmission the bottom graph is back scattering signal. Time is in days, hours, minutes seconds. X axis is the distance from bottom of the cell.

Sodium metasilicate solution (FIG. 1).

A solution comprising 20 g of sodium metasilicate in 80 g of distilled water is placed on top of a set cement sample. The majority of the solution becomes clearer with time as evidenced by the increasing transmission. However, there is some precipitation close to the cement surface as evidenced by the decrease in transmission between the T=0 (pink (bottom)) line and the T=2 days 19 hours (red (top)) line at a distance of 26 to 27 mm.

Figure 2:
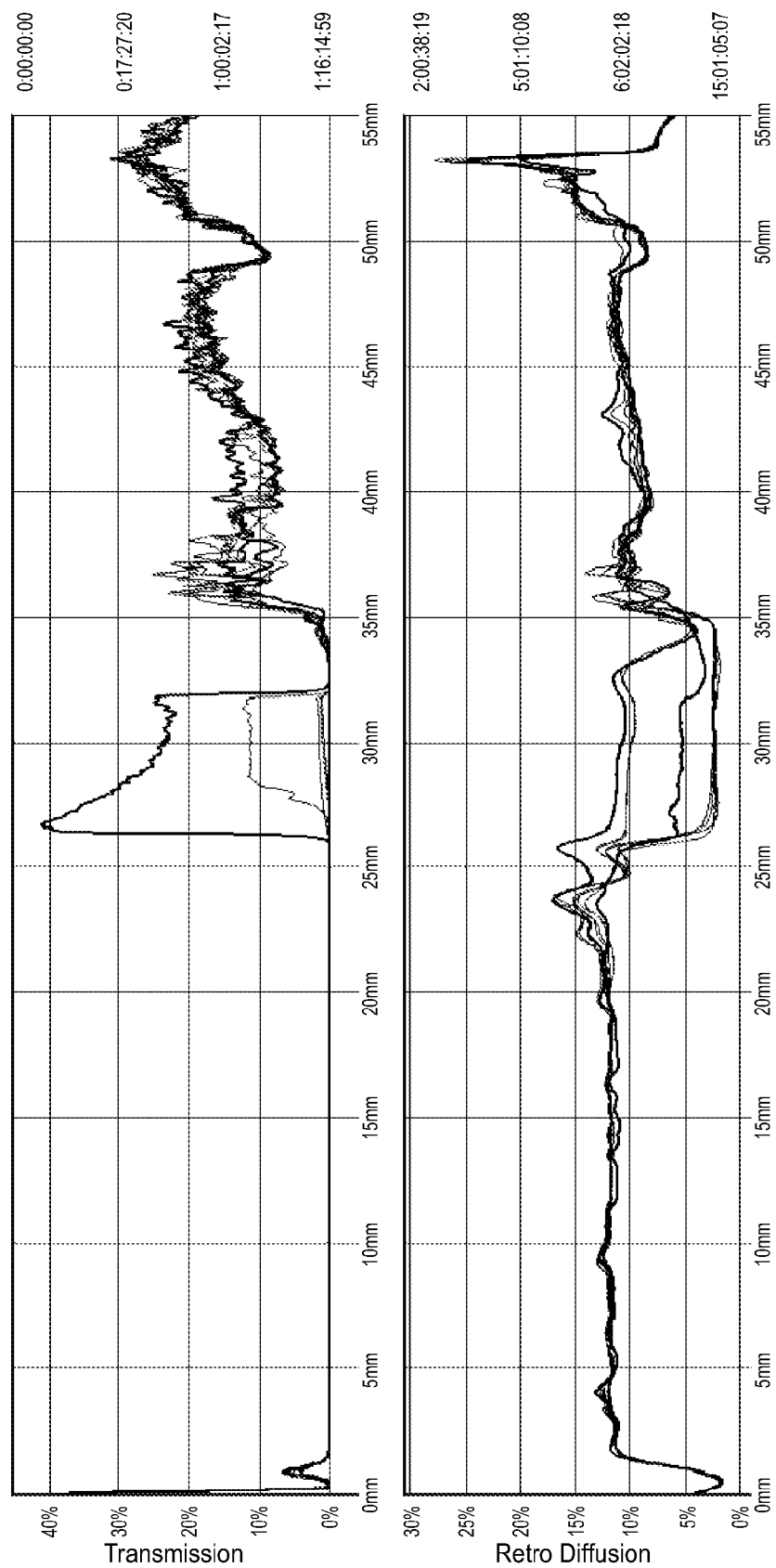
FIG. 2 shows the optical transmission (top) and back scattering (bottom) results for cement treated with an iron (III) chloride solution.

Iron III chloride solution (FIG. 2).

Figure 3:
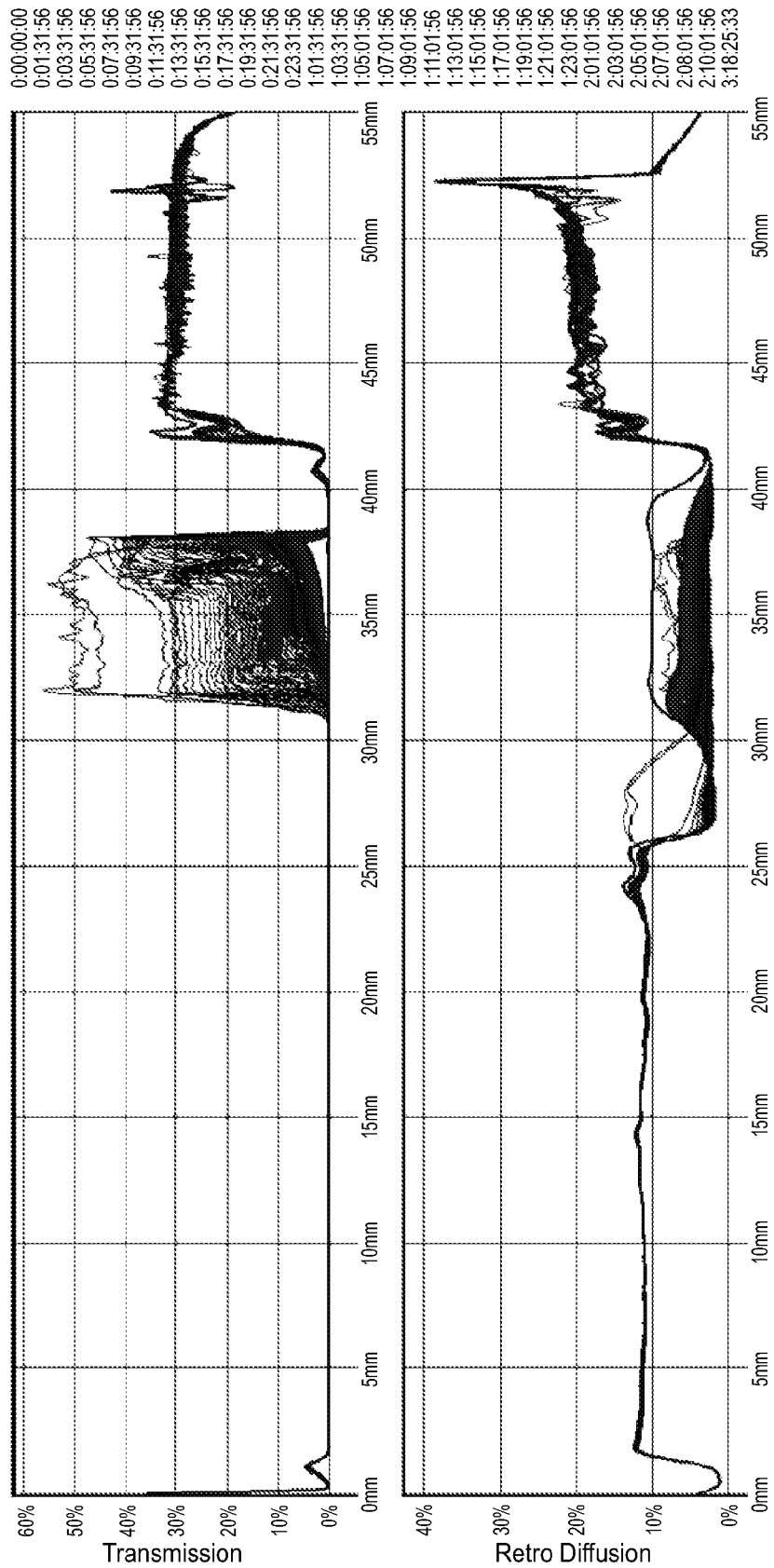
FIG. 3 shows the optical transmission (top) and back scattering (bottom) results for cement treated with an iron (III) chloride solution with measurements taken every 2 hours.

A solution comprising 7.5 g $FeCl_3$ in 42.5 g distilled water is placed on top of set cement. This test was run over a period of 15 days. There is a rapid decrease in transmission coefficient over the entire depth of the brine sample during the first 17 hours. After 2 days there is virtually no transmission through the brine indicating that there has been significant precipitation throughout the brine. The 17 hour trace shows that the highest concentration of precipitate is near the cement surface. FIG. 3 shows a repeat test using iron (III) chloride solution but with measurements made every two hours. The build up of precipitation from the cement surface upwards and the decrease of transmission coefficient with time is clearly visible. The baseline transmission coefficients of the iron chloride solutions are lower than for the other brines due to the colour of the brine.

Figure 4:
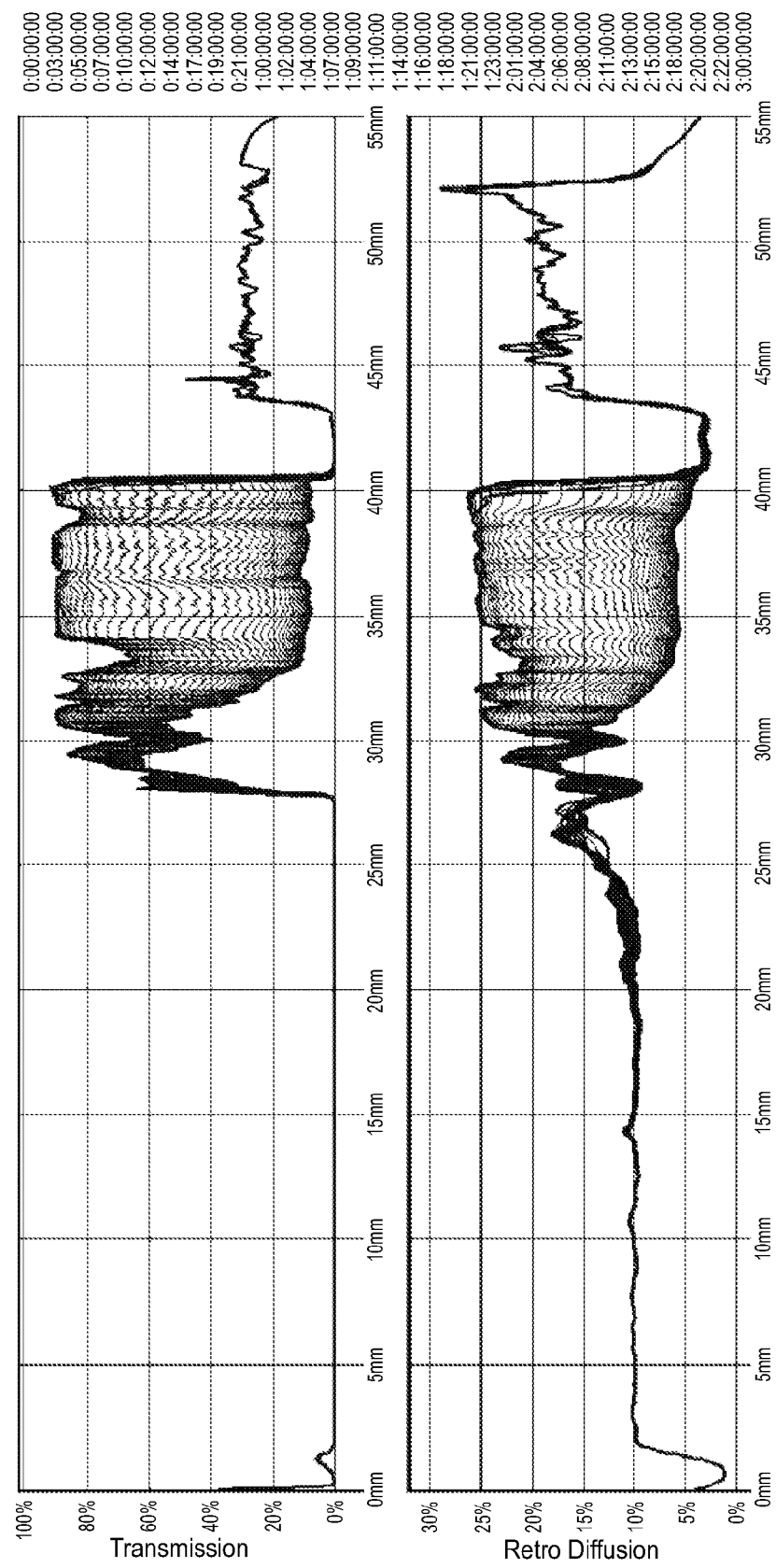
FIG. 4 shows the optical transmission (top) and back scattering (bottom) results for cement treated with a magnesium chloride solution.

Magnesium Chloride (FIG. 4)

A solution comprising 16 g $MgCl_2.6H_2O$ in 34 g distilled water is placed on top of set cement. There is a decrease in transmission coefficient with time but it is less marked than with the other solutions.

Example 4

Fissure Blocking Tests

Figure 5:
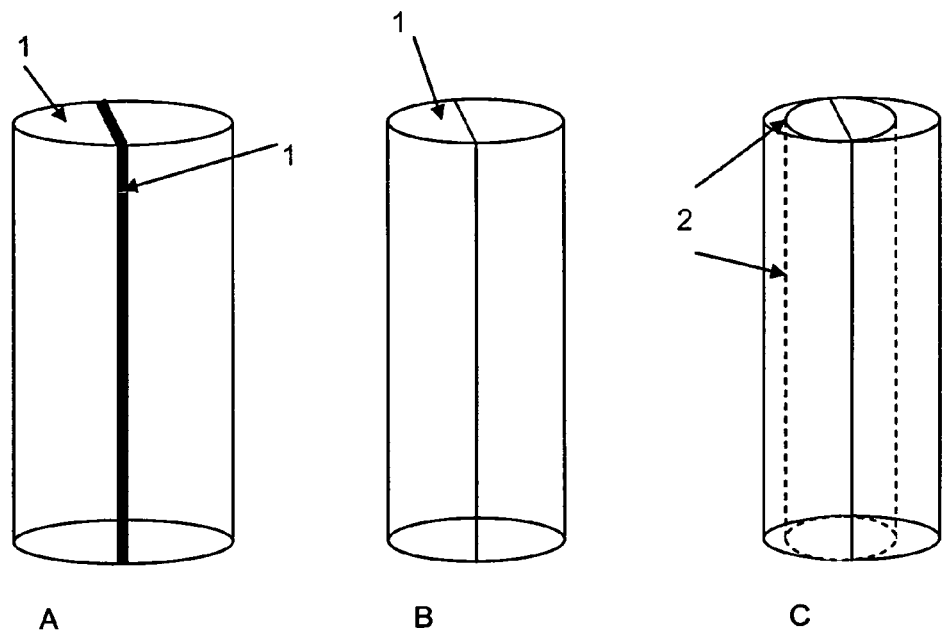
FIGS. 5 and 6 show diagrams of the sample preparation for the fissure blocking test.

Tests were prepared to simulate a fissure in a cement sheath to evaluate the effectiveness of the brines in blocking small fissures in cement. FIG. 5 shows a diagram of the sample preparation. A conventional 1890 kg/m³ class G well cement system was prepared and cured for 3 days at 60° C. in a cylindrical mould. A 37 mm diameter cylinder was then cored from the mould and subsequently cut lengthways (FIG. 5A). The width of the saw cut 1 is approximately 2 mm. The two half cylinders were then placed with their flat faces together (FIG. 5B); the missing width due to the saw cut means that the cross section is now not perfectly circular. The assembly B was embedded in plaster to firmly hold the two pieces together. Once the plaster set a 25 mm diameter core plug 2 was cut from the sample so that the split was in the middle of the resultant core and the cross section of the 25 mm diameter core was perfectly circular (FIG. 5C)—there was no "missing" part due to a saw cut. Several samples were prepared this way with lengths between 5 cm and 7 cm.

Figure 6:
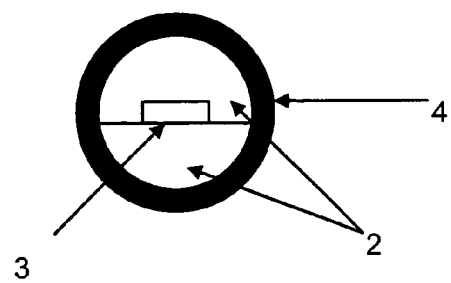

The test consists of a small slot 3 that is filed into one flat face of one of the cylinders to provide a channel the length of the sample as shown in FIG. 6. The assembly is then inserted in the rubber sleeve 4 of the Hassler cell.

Figure 7:
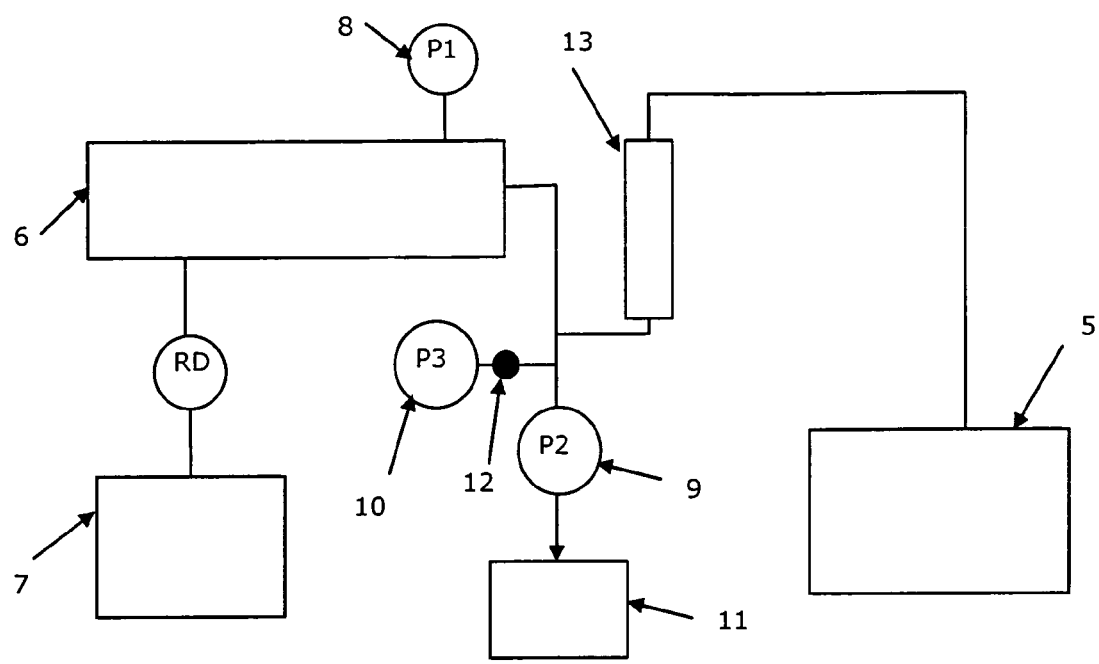
FIG. 7 shows a schematic diagram of the equipment used in the fissure blocking test.

FIG. 7 shows the equipment setup for the experiment comprising a high pressure liquid chromatography (HPLC) pump 5, a Hassler cell 6 and a confining pressure pump 7. The pump 5 is a Pharmacia model P-500 HPLC pump. The Hassler cell 6 is from Temco model DCHO-1.0 with a working pressure of 34 MPa. The confining pressure pump 7 is an Ametek Portable Hydraulic Pressure Tester, model T620. P1 is an analogue pressure gauge 8 to give an indication of the confining pressure. P2 and P3 were Validyne pressure transducers 9, 10 with CD23 signal conditioners that were connected to a Kipp and Zonen chart recorder 11. P3 was a 25 psi full scale transducer 10 that could be isolated from the system by a valve 12 when pressures increased. P2 was a 200 psi pressure transducer 9. The pressure transducers were calibrated against an Ametek Jofra Instruments PPCE pressure calibrator. The displacement cylinder 13 was used so that brine would not be pumped through the HPLC pump 5. When required the cylinder 13 was filled with brine and water pumped into the top by the HPLC pump 5 to displace the brine through the cement sample. The cylinder was bypassed when pumping water only. There would be a little dilution of the brine at the top brine water interface, but the cylinder is never completely emptied so the dilution does not affect the results.

The test procedure is as follows: the test sample is loaded into cell; a 3 MPa confining pressure is applied; water is flowed at different rates and pressures are measured; pressure transducer P3 is isolated if necessary; brine is added to the displacement cylinder, and pumping through the core is started; pressure is monitored; pumping is stopped for a given time; pumping is restarted and maximum pressure obtained is determined.

Initially water is flowed through the channel to determine the effective height using the equation for flow of a Newtonian fluid through a slot:

$$s = \sqrt[3]{\frac{12\mu LQ}{\Delta P w}} \qquad \text{Equation 1}$$

where: s is the channel height (m); $\mu$ is the fluid viscosity (Pa·s); L is the length of the channel (m); Q is the flow rate (m³/s); $\Delta P$ is the pressure drop across the sample (Pa); w is the width of the channel (m).

For each test the average width of the engraved channel is measured and the average height of the channel calculated from equation 1 and the water flow measurements.

Test 1 Sodium Metasilicate Solution

The sodium metasilicate solution contained 20 g of sodium metasilicate in 80 g distilled water. The height of the channel obtained from water flow measurements is shown in Table 3. The sodium metasilicate solution was then injected into the slot and left for 3 days. When flow was restarted there was a slight increase in pressure to 1.2 psi which then decreased to 0.8 psi as the partial blockage was removed.

TABLE 3

Calculated slot height for test 1.
Slot length = 51.9 mm, slot width = 7.9 mm.

| Flow rate (ml/hr) | Pressure (psi) | Calculated slot height (μm) from equation 1 |
|---|---|---|
| 400 | 0.64 | 126 |
| 300 | 0.51 | 123 |
| 200 | 0.38 | 119 |
| 100 | 0.26 | 107 |

Test 2 Sodium Metasilicate Solution

A repeat test was performed on a separate cement sample (Table 4) and the sodium metasilicate solution was again left in the sample for 3 days. When flow was restarted there was no noticeable increase in pressure. These two tests indicate that although sodium metasilicate solutions precipitate next to cement they are not effective in blocking gaps of around 100 microns under these test conditions.

TABLE 4

Calculated slot height for test 2.
Slot length = 61.9 mm, slot width = 8.6 mm.

| Flow rate (ml/hr) | Pressure (psi) | Calculated slot height (μm) from equation 1 |
|---|---|---|
| 400 | 1.67 | 94 |
| 300 | 1.13 | 97 |
| 200 | 0.67 | 101 |
| 100 | 0.26 | 110 |

Test 3 FeCl₃ Solution

An iron (III) chloride solution was made containing 7.5 g of FeCl$_3$ in 42.5 g distilled water. Following water injection to determine the slot height (Table 5) the iron (III) chloride solution was injected into the slot and then left for 3 days. On restarting flow at a pump flow rate of 25 mL/hr the injection pressure increased to >200 psi indicating that the iron chloride solution had successfully blocked the fissure.

TABLE 5

Calculated slot height for test 3.
Slot length = 47.7 mm, slot width = 9.5 mm.

| Flow rate (ml/hr) | Pressure (psi) | Calculated slot height (μm) from equation 1 |
|---|---|---|
| 400 | 5.64 | 56 |
| 300 | 4.31 | 55 |
| 200 | 2.57 | 57 |
| 100 | 1.18 | 59 |

Test 4 $Fe_2(SO_4)_3$ Solution

An iron (III) sulphate solution was made containing 8.8 g of iron (III) sulphate in 41.2 g distilled water. Following water injection to determine the slot height (Table 6) the iron (III) sulphate solution was left for 24 hours. On restarting flow at a pump flow rate of 25 mL/hr the injection pressure increased to >193 psi indicating that the iron sulphate solution had successfully blocked the slot.

TABLE 6

Calculated slot height for test 4.
Slot length = 59.3 mm, slot width = 7.0 mm.

| Flow rate (ml/hr) | Pressure (psi) | Calculated slot height (μm) from equation 1 |
|---|---|---|
| 400 | 2.02 | 93 |
| 300 | 1.53 | 93 |
| 200 | 0.92 | 96 |
| 100 | 0.33 | 107 |

From these tests performed it appears iron salts are the preferred salts to make brines for this application. Silicate solutions were not as effective as the iron salts when it came to blocking the fissures even though they produced precipitate in contact with cement.

Example 5

The invention is also applicable to high temperature environments. A solids free iron (III) chloride solution was added to a cement sample. The cement sample had been aged at 200° C. for one year and then sat around in water for more than two years. A precipitate formed when the cement sample was contacted with the solution.

The cement phase that is present at temperatures of 200° C. is the same as the cement phase that will be present at temperatures up to at least 350° C. Therefore from this test it appears that the solids free metal solutions may be capable of forming precipitates in very high temperature environments. Because the solution only reacts when in contact with the cement there are no retardation issues when the method is carried out in a very high temperature environment, i.e. at least 350° C.

This invention can also be applied to non-Portland cement based sealants in the well or to composite sealants (mixtures of Portland cement and other materials). In each case it requires that either the cation or anion or both in the brine solution will precipitate when in contact with the sealant that is already in the wellbore.

The invention claimed is:

1. A method of repairing a set cement in a wellbore comprising:
   providing a solids-free solution of at least one salt capable of reacting with the interstitial water of the set cement to form a solid phase comprising a precipitate or an expanded phase of the cement;
   performing a squeeze cementing operation after injecting the salt solution into the well and allowing the solution to contact a region of the set cement to be repaired with the solution so as to form the solid phase in voids in the region of the set cement to be repaired.

2. The method according to claim 1, wherein the solution reacts with calcium, hydroxide, or sulfate or a combination thereof in the interstitial water of the set cement.

3. The method according to claim 1 wherein the solution comprises one or more alkali metal silicates, magnesium chloride, iron chlorides or other iron salts, aluminum chloride, alkali metal aluminates, magnesium phosphate, potassium phosphate, sodium phosphate, or sodium fluoride or combinations thereof.

4. The method according to claim 3, wherein the solution is an iron (III) solution.

5. The method according to claim 1 wherein the solution further comprises water soluble polymers.

6. The method according to claim 1, further comprising injecting a spacer fluid into the well before contacting the cement with the salt solution.

7. The method according to claim 1 wherein the cement is exposed to temperatures up to at least 350° C.

8. A composition for repairing a cement structure in a well, comprising a solids-free solution of at least one salt capable of reacting with the interstitial water of the set cement to form a solid phase comprising a precipitate or an expanded phase of the cement, wherein the composition further comprises water soluble polymers.

9. The composition of claim 8, wherein the salt comprises one or more alkali metal silicates, magnesium chloride, iron chlorides or other iron salts, aluminum chloride, alkali metal aluminates, magnesium phosphate, potassium phosphate, sodium phosphate, or sodium fluoride or combinations thereof.

10. The composition of claim 9, wherein the salt comprises an iron (III) chloride.

11. A method of restoring zonal isolation of a cemented wellbore comprising injecting a solids-free solution, letting said solution penetrate any failure of the set cement, allowing the set cement and the solids-free solution to react so as to restore zonal isolation, wherein the solids-free solution comprises at least an iron salt that reacts with hydroxide ions of the interstitial phase of the set cement to precipitate iron (III) hydroxide thus preventing any ingress of fluid.

12. The method of claim 11, wherein a spacer is pumped ahead of the solids-free solution to clean any other sources of anion or cation possibly present in the wellbore thus avoiding premature reaction of the solids-free solution.

13. The method of claim 11, wherein the salt comprises one or more alkali metal silicates, magnesium chloride, iron chlorides or other iron salts, aluminum chloride, alkali metal aluminates, magnesium phosphate, potassium phosphate, sodium phosphate, or sodium fluoride or combinations thereof.

14. The method of claim 11, wherein the salt comprises iron (III) chloride.

15. The method of claim 11, wherein the solution further comprises water soluble polymers.

16. The method of claim 11, wherein a spacer is pumped ahead of the solids-free solution to clean any other sources of anion or cation possibly present in the wellbore thus avoiding premature reaction of the solids-free solution.

* * * * *

UNITED STATES PATENT AND TRADEMARK OFFICE
CERTIFICATE OF CORRECTION

| | | |
|---|---|---|
| PATENT NO. | : 8,839,866 B2 | Page 1 of 1 |
| APPLICATION NO. | : 12/993335 | |
| DATED | : September 23, 2014 | |
| INVENTOR(S) | : James | |

It is certified that error appears in the above-identified patent and that said Letters Patent is hereby corrected as shown below:

On the title page item [75], 2nd inventor's first name

Insert --Michel Michaux--
Delete "Michael Michaux"

Signed and Sealed this
Twenty-sixth Day of January, 2016

Michelle K. Lee
*Director of the United States Patent and Trademark Office*